United States Patent
Mair

(10) Patent No.: US 8,239,107 B2
(45) Date of Patent: Aug. 7, 2012

(54) METHOD FOR STARTING CONTROL UNIT OF A MOTOR VEHICLE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 455 days.

(21) Appl. No.: 12/529,280

(22) PCT Filed: Mar. 5, 2008

(86) PCT No.: PCT/EP2008/052670
§ 371 (c)(1),
(2), (4) Date: Aug. 31, 2009

(87) PCT Pub. No.: WO2008/113689
PCT Pub. Date: Sep. 25, 2008

(65) Prior Publication Data
US 2010/0094513 A1    Apr. 15, 2010

(30) Foreign Application Priority Data
Mar. 16, 2007 (DE) .......................... 10 2007 012 788

(51) Int. Cl.
*G06F 7/00* (2006.01)
(52) U.S. Cl. .............. 701/67; 701/68; 701/70; 477/185; 477/195
(58) Field of Classification Search .............. 701/67, 701/68, 70; 477/185, 195
See application file for complete search history.

(56) References Cited

U.S. PATENT DOCUMENTS

| | | | |
|---|---|---|---|
| 6,411,881 B1 * | 6/2002 | Thomas | 701/67 |
| 6,439,675 B1 * | 8/2002 | Zechmann et al. | 303/191 |
| 7,206,682 B2 * | 4/2007 | Bodin et al. | 701/67 |
| 7,226,389 B2 * | 6/2007 | Steen et al. | 477/195 |
| 7,344,478 B2 * | 3/2008 | Reith | 477/171 |
| 7,401,873 B2 * | 7/2008 | Werner | 303/191 |
| 2006/0079377 A1 | 4/2006 | Steen et al. | |

FOREIGN PATENT DOCUMENTS

| | | |
|---|---|---|
| DE | 199 50 034 A1 | 4/2001 |
| DE | 100 65 589 A1 | 7/2002 |
| DE | 101 03 713 A1 | 11/2002 |
| DE | 102 44 024 A1 | 4/2004 |
| DE | 10 2004 043 119 A1 | 7/2005 |
| DE | 10 2004 017 703 A1 | 10/2005 |
| DE | 10 2004 045 434 A1 | 3/2006 |
| DE | 10 2005 001 550 A1 | 7/2006 |
| EP | 1 447 261 A1 | 8/2004 |
| EP | 1 584 531 A1 | 10/2005 |

\* cited by examiner

*Primary Examiner* — Mark Hellner
(74) *Attorney, Agent, or Firm* — Davis & Bujold, P.L.L.C.

(57) ABSTRACT

In order to achieve a comfortable starting process with low wear, a braking torque, set by the driver by way of a brake pedal, an acceleration torque, requested by the driver via the accelerator pedal, and a holding torque, required for holding a motor vehicle on a gradient, are determined, and the engagement of the starting clutch, as well as the release of the service brake, are coordinated such that during the release of the service brake, the sum of the clutch torque and braking torque corresponds to the holding torque, and the clutch torque of the starting clutch is increased by the acceleration torque only when the service brake has been largely released.

19 Claims, 1 Drawing Sheet

METHOD FOR STARTING CONTROL UNIT OF A MOTOR VEHICLE

This application is a National Stage completion of PCT/EP2008/052670 filed Mar. 5, 2008, which claims priority from German patent application serial no. 10 2007 012 788.1 filed Mar. 16, 2007.

FIELD OF THE INVENTION

The invention relates to a method for the starting control of a motor vehicle, the drive train of which comprises a driving engine that is configured as a combustion engine and can also be automatically controlled, in addition to being controllable by way of an accelerator pedal, a starting clutch configured as an automated friction clutch, a transmission with variable gear ratios, and a service brake, which is configured as a pressure medium-actuated friction brake and can also be automatically controlled, in addition to being controllable by way of a brake pedal. In a starting mode of a starting assistance controller, which can be activated with a stopped vehicle, a running driving engine, a disengaged starting clutch, a set gear ratio and a service brake actuated by way of a brake pedal, upon a release of the brake pedal, the service brake initially remains engaged by maintaining the brake pressure previously set by way of the brake pedal, and upon a subsequent actuation of the accelerator pedal, the engine torque of the driving engine is increased, the clutch torque of the starting clutch is increased by engagement of the starting clutch, and the brake torque of the service brake is reduced by a lowering of the brake pressure.

BACKGROUND OF THE INVENTION

The starting of a motor vehicle generally represents a difficult operational process, because three essentially independent control sequences must be coordinated with each other with respect to the time sequences and the metering thereof. It involves the build-up of a torque required for the starting process in the driving engine, the engaging of the starting clutch in order to transmit the torque required for the starting process, and the disengaging of the service brake in order to reduce and remove braking torque previously applied. If these three control sequences take place in a poorly coordinated manner, this adversely affects comfort, in particular a starting jerk as the motor vehicle starts to roll, increased wear and tear on the friction elements of the starting clutch, and increased environmental impact, such as increased fuel consumption and increased noise and exhaust gas emissions. Especially critical is the starting of a motor vehicle on a hill or a stretch of an incline, since poorly coordinated control sequences may result in an undesired and possibly dangerous backward rolling of the motor vehicle opposite the desired direction of travel.

In order to relieve a driver of the difficult control task of starting, devices and methods have been proposed and developed, especially for use in heavy-duty commercial vehicles such as trucks and buses, which generally can be referred to as starting assistance and by which coordination of required control sequences takes place largely automatically.

The functional principle of most known starting assistance controllers consists of the brake pressure of the service brake set by way of the brake pedal being initially maintained in a starting mode, which can be activated with a stopped vehicle, a running driving engine, a disengaged starting clutch, an engaged starting gear, and the service brake actuated by way of the brake pedal, without the driver having to actuate the brake pedal again. If the driver releases the brake pedal and actuates the accelerator pedal within a predetermined time span, the engine torque of the driving engine is increased proportionally to the travel distance, and optionally to the control speed of the accelerator pedal, and simultaneously the starting clutch is actuated in the engaging direction.

If in the process a travel distance of the starting clutch is reached in which the measured or calculated clutch torque corresponds at least to the holding torque required for holding the motor vehicle or to a higher torque, then a control signal to release the service brake is emitted and the service brake is released by lowering the brake pressure. The motor vehicle then is set in motion, and the starting mode is ended upon the full engagement of the starting clutch or upon exceeding a minimum drive speed. If the driver does not actuate the brake pedal and/or the accelerator pedal within the predetermined time span, the starting mode is likewise ended and the service brake is released, without a starting process having taken place.

A corresponding method for preventing accidental rolling away of a stopped vehicle is known from DE 102 44 024 A1. According to this method, with an activated holding function, it is provided during a starting process that the service brake is released upon reaching a certain travel distance of the starting clutch, wherein the travel distance in question either is predetermined or derived from the currently required holding torque. The holding torque is determined from the driving resistance, in which the current vehicle weight and the roadway gradient are taken into account. The service brake is thus only released when the starting clutch already transmits such a driving torque that is sufficient for holding the motor vehicle on a gradient. The driving torque transmitted by the starting clutch, which is still increased more during the further course in order to enable a starting acceleration, thus works against the braking torque of the service brake until the full release of the service brake, which results in increased wear on the starting clutch and an uncomfortable starting jerk. If no foot pedal (brake pedal or accelerator pedal) is actuated within a predetermined time period, the service brake is likewise released and the holding function ended.

A similar method for preventing a rolling away of a motor vehicle is described in DE 10 2004 045 434 A1. This known method provides that the service brake is released as a function of the amount of a measured value and/or a stored parameter. The measured value primarily is a value of the drive torque transmitted via the starting clutch and/or the transmission, which is sufficient for a starting process without any backward rolling of the motor vehicle. This parameter preferably is a time period, after the expiration of which the service brake is likewise released, if within this time period no new actuation of the brake pedal has taken place. The release of the service brake occurs in such a way that the brake pressure is reduced from a fixed pressure value with a constant pressure gradient.

Another method for the starting assistance of a motor vehicle is disclosed in DE 10 2004 017 703 A1. In this known method, the coupling torque transmitted from the starting clutch is determined by calculation, and a parking brake, which can either be a service brake or an additional brake device, is released when the coupling torque determined by calculation is equal to or greater than the braking torque set by the driver by way of the brake pressure or the starting torque required for a desired starting acceleration. The release of the parking brake preferably occurs by means of a ramp-like reduction of the brake pressure, which is to say a lowering of the brake pressure with a constant pressure gradient.

Since the braking torque set by the driver by way of actuating the brake pedal and the starting torque required for a certain starting acceleration generally are definitely above the holding torque required to hold the motor vehicle on a gradient, backward rolling of the motor vehicle on a gradient can be reliably prevented. During the engaging of the starting clutch and the disengaging of the parking brake, however, the starting clutch permanently works against the parking brake, which is associated with higher wear on the starting clutch and an uncomfortable starting jerk.

Finally, a method for the starting control of a motor vehicle is also known from DE 10 2005 001 550 A1. Provided in this method is that the degree of engagement or the travel distance of the starting clutch, at which the signal to release the service brake is emitted, is determined from the reaction of the drive train actuators, such as a coupling actuator of the starting clutch, a power actuator of the driving engine, to the travel distance and/or the control speed of the accelerator pedal. The degree of engagement or the travel distance, at which the signal to release the service brake is emitted, can be determined more exactly from the respectively known deviation between the actual values and the target values, for example the travel distance or the control speed of the starting clutch and/or the engine torque or the rotational speed of the driving engine, and thus a larger deviation of the transmitted driving torque from a target value at the time of a completely released service brake can be avoided. The fundamental disadvantage that the signal to release the service brake is only sent when a relatively high torque is already present on the starting clutch, which acts against the service brake that is still completely engaged at this time, however, still applies.

It can be said in summary that in the known methods for the starting control of a motor vehicle, the signal to release the service brake is only issued when the starting clutch already transmits relatively high driving torque, which corresponds at least to the holding torque required at that moment to hold the motor vehicle on a gradient. Thereafter, the engine torque of the driving engine and the coupling torque of the starting clutch are simultaneously increased further in order to enable a starting acceleration, and the braking torque of the service brake is reduced by a decrease of the previously trapped brake pressure. The coupling torque thus works against the braking torque until a complete release of the service brake, which is associated with the known disadvantages.

Also, the amount of the initial braking torque determined by the trapped brake pressure of the service brake and the course of the function, with which the braking torque is reduced after the signal to release the service brake has been issued, are considered only unsatisfactorily or not at all during the engagement of the starting clutch. The known methods, likewise, contain no practical possibility for a gentle start occasionally desired by the driver, or for holding the motor vehicle with the starting clutch during any slight deflection of the accelerator pedal. If the motor vehicle is located on a downgrade propping off in the direction of travel, starting with the known method by way of a controlled release of the service brake by the driver using the brake pedal without prior release of the brake pedal and letting a fixed time period pass, or without a prior actuation of the accelerator pedal, is not possible.

SUMMARY OF THE INVENTION

The object of the present invention against this background is a method for the starting control of the type of motor vehicle mentioned at the beginning with which a starting process can be performed, while preventing backward rolling on a gradient, in a more comfortable manner and with less wear.

The invention is based on a method for the starting control of a motor vehicle, the drive train of which comprises a driving engine that is configured as a combustion engine and can also be automatically controlled, in addition to being controlled by way of an accelerator pedal, a starting clutch configured as an automated friction clutch, a transmission with variable gear ratios, as well as a service brake, which is configured as a pressure medium-actuated friction brake and can also be automatically controlled, in addition to being controlled by way of a brake pedal, wherein in a starting mode of a starting assistance controller, which can be activated with a stopped vehicle, a running driving engine, a disengaged starting clutch, a set gear ratio and a service brake actuated by way of a brake pedal, upon release of the brake pedal the service brake initially remains engaged by maintaining the brake pressure $p_B$, previously set by way of the brake pedal, and upon a subsequent actuation of the accelerator pedal, the engine torque $M_M$ of the driving engine is increased, the clutch torque $M_K$ of the starting clutch is increased by engaging the starting clutch, and the brake torque $M_B$ of the service brake is reduced by lowering the brake pressure $p_B$.

A braking torque $M_B$ set by the driver using the brake pedal, an acceleration torque $M_A$ requested by the driver by way of the accelerator pedal, and a holding torque $M_H$ required to hold the motor vehicle on a gradient are determined, and that the engagement of the starting clutch as well as the release of the service brake are coordinated such that during the release of the service brake the sum of the clutch torque $M_K$ and the braking torque $M_B$ correspond to the holding torque $M_H$ ($M_K+M_B=M_H$), and the clutch torque $M_K$ of the starting clutch is only increased by the acceleration torque $M_A$ once the service brake has been largely released ($M_B=0$).

The method according to the invention is based on the knowledge that a starting process can occur without high wear, in particular on the starting clutch, but also on the service brake and on other components of the drive train, and without an uncomfortable starting jerk, if the build-up of the clutch torque $M_K$ of the starting clutch and the reduction of braking torque $M_B$ of the service brake are coordinated with each other such that the sum of both torques just corresponds to the holding torque $M_H$ required at the moment to hold the motor vehicle on a gradient.

Provided that the engine torque $M_M$ of the driving engine is automatically adapted to the clutch torque $M_K$ set in the starting clutch, the drive torque transmitted from the starting clutch increases exactly to the same extent as the braking torque $M_B$ of the service brake decreases by a lowering of the brake pressure $p_B$. Both torques ($M_K$, $M_B$) are thus initially controlled inversely proportional to each other until the braking torque $M_B$ is largely eliminated. Only thereafter is the clutch torque $M_K$ increased by the acceleration torque $M_A$, and of course the engine torque $M_M$ of the driving engine is increased to the same extent, in order to produce the required starting acceleration of the motor vehicle requested by the driver by way of the deflection of the accelerator pedal.

For appropriate control of the starting process, it is necessary to know the torques determined by external influences, such as the holding torque $M_H$ and the acceleration torque $M_A$ and the momentary values of the clutch torque $M_K$ and the braking torque $M_B$, which for comparability advantageously refer to a common plane, which preferably is the plane of the starting clutch.

While in the case of an automated starting clutch, which is assumed here, the current clutch torque $M_K$ can be determined in a known manner from engine characteristic maps as a function of certain actuating variables, such as the engagement travel $x_K$ for a dry clutch and the engagement pressure $p_K$ for a wet clutch, the remaining torque values must be directly measured or calculated from certain measured values.

For the determination of the braking torque $M_B$, it is preferred that the braking pressure $p_B$ of the service brake is acquired by a sensor and therefrom, along with the geometry of the wheel brakes, a resulting wheel brake torque $M_{BR}$ is calculated from which the braking torque $M_B$ is calculated in relation to the plane of the starting clutch by means of the resulting ratio $i_D$ of an axle and/or central differential and the ratio $i_G$ of the transmission. The wheel brake torque $M_{BR}$ and the braking torque $M_B$ related to the plane of the starting clutch thus result from the equations $$M_{BR} = n_{BR} * \mu_B * p_B * A_B * r_B$$

and $$M_B = M_{BR}/(i_D * i_G) = n_{BR} \mu_B * p_B * A_B * r_B/(i_D * i_G)$$

where $n_{BR}$ signifies the number of wheel brakes, $\mu_B$ is the average friction coefficient of the wheel brakes, $A_B$ is the average friction surface of the wheel brakes, and $r_B$ is the average effective radius of the wheel brakes.

In order to determine the acceleration torque $M_A$, it is preferred to acquire, via a sensor, the position $x_{FP}$ and/or the control speed $dx_{FP}/dt$ of the accelerator pedal, and to derive therefrom a requested vehicle acceleration $a_F$, and from this along with a determined vehicle weight $m_F$ to calculate an acceleration force $F_A$ from which the acceleration torque $M_A$ is calculated in relation to the plane of the starting clutch, together with the effective radius $r_R$ of the drive wheels, the resulting ratio $i_D$ of an axle and/or central differential, and the ratio $i_G$ of the transmission. While the vehicle acceleration $a_F$ is determined from the corresponding engine characteristic maps as a function of the travel distance $x_{FP}$ and/or the control speed $dx_{FP}/dt$ of the accelerator pedal, the acceleration force $F_A$ derived therefrom and the acceleration torque $M_A$ result from the equations $$F_A = m_F * a_F$$

and $$M_A = F_A * r_R/(i_D * i_G) = m_F * a_F * r_R/(i_D * i_G).$$

For the determination of the holding torque $M_H$, it is preferred to determine the roadway gradient $\alpha$ and the vehicle weight $m_F$ from which a climbing resistance $F_S$ is calculated, and thus together with a determined rolling resistance $F_R$ a driving resistance $F_W$ is calculated, from which the holding torque $M_H$ related to the plane of the starting clutch is calculated using the radius $r_R$ of the drive wheels, the resulting ratio $i_D$ of an axle and/or central differential, and the ratio $i_G$ of the transmission. Several known methods are already available for the determination of the roadway gradient $\alpha$ and the vehicle weight $m_F$. Accordingly, the inclination angle $\alpha$ of the roadway can be determined using a longitudinal inclination sensor, or from data of a navigation system, the vehicle weight $m_F$ can be determined based on the known empty weight of the motor vehicle using one or more load sensors, and both values can be determined from the driving behavior of the motor vehicle in a prior driving cycle or from the statistically measured values of chassis sensors. The rolling resistance $F_R$ is largely constant for a low driving speed and can be considered in the form of a constant offset value for the climbing resistance $F_S$. The driving resistance $F_W$ and the holding torque $M_H$ result accordingly from the equations $$F_W = F_S + F_R = m_F * g * \sin\alpha + F_R$$

and $$M_H = F_W * r_R/(i_D * i_G) = (m_F * g * \sin\alpha + F_R) * r_R/(i_D * i_G),$$

where g is the gravitational acceleration of 9.81 m/sec and sine $\alpha$ is the sine of the positive inclination angle $\alpha$ of the roadway with an ascending roadway in the direction of driving.

If a motor vehicle is decelerated to a stop by actuation of the brake pedal or held on a gradient by actuation of the brake pedal after starting the motor vehicle, then the brake pressure $p_B$ set by the brake pedal is higher as a rule than is necessary for holding a vehicle. This means the current braking torque $M_B$ of the service brake at the beginning of a starting process is usually considerably higher than the holding torque $M_H$ required at that moment to hold the motor vehicle on the gradient. If in this case engagement of the starting clutch and release of the service brake were to begin simultaneously upon starting, then the starting clutch would initially work against the relatively high braking torque $M_B$ of the service brake, which would result with unnecessarily high wear, in particular of the friction elements of the starting clutch. It is therefore advantageous if, with a braking torque $M_B$ ($M_B > M_H$) above the holding torque $M_H$ at the beginning of the starting process, the engagement of the starting clutch is delayed until the brake pressure $p_B$ of the service brake has been reduced so much that the current braking torque $M_B$ corresponds approximately to the holding torque $M_H$ ($M_B = M_H$).

During this delay in engagement, the starting clutch can already be engaged up to the gripping point so that a subsequent delay in the response behavior of the starting clutch, which is caused in a dry clutch by bridging free travel until the application of the friction discs on the drive plate and in the case of a multiple disc clutch by bridging the free travel until the application of the discs, as well as in the case of both clutch designs by prior filling of a hydraulic or pneumatic actuating cylinder, can be avoided.

In order to keep the control effort as small as possible, it is useful to provide that the starting clutch is engaged after a predetermined time-related course of function, and that clutch torque $M_K$ of the starting clutch, or a variable determining the amount of the clutch torque $M_K$ is used as a control parameter to control the decrease of the braking torque $M_B$ of the service brake. This means that the starting clutch is engaged independently of other control processes, in particular of the presently set braking torque $M_B$ of the service brake, and that the service brake is released independently of the presently set clutch torque $M_K$ such that the sum of both torques ($M_B + M_K$) corresponds to the holding torque $M_H$ ($M_B + M_K = M_H$).

Since the determination of the current clutch torque $M_K$ requires a certain calculation and/or sensor effort, it is preferred that the engagement travel $x_K$ be used as a control parameter for a starting clutch designed as a dry clutch, and that the engagement pressure $p_K$ be used as a control parameter for a starting clutch designed as a wet clutch, for the reduction of the braking torque $M_B$ of the service brake.

Since the determination and setting of the correct value of the braking torque $M_B$ are associated with a given uncertainty, the braking pressure $p_B$ of the service brake is advantageously increased by a safety margin $\Delta p_{BS}$ during reduction of the braking torque $M_B$, so that undesired backward rolling of the motor vehicle can be reliably prevented.

As an alternative, however, the service brake can also be released after a predetermined, time-related course of function in order to reduce the control effort, and the braking torque $M_B$ or a variable determining the amount of the braking torque $M_B$ can be used as a control parameter to control the build-up of the clutch torque $M_K$ of the starting clutch. This means that the service brake is disengaged independently of the presently set clutch torque $M_K$ of the starting clutch, and that the starting clutch is engaged as a function of the presently set braking torque $M_B$ such that the sum of both torques ($M_B+M_K$) corresponds to the holding torque $M_H$.

In order to avoid a sensory acquisition or a calculation of the braking torque $M_B$, it is preferred that the brake pressure $p_B$ of the service brake is used as a control parameter for the build-up of the clutch torque $M_K$ of the starting clutch.

Since the determination and setting of the correct value of the clutch torque $M_K$ is associated with a given uncertainty, during the build-up of the clutch torque $M_K$ the engagement travel $x_K$ is usefully increased in a starting clutch designed as a dry clutch, and the engagement pressure $p_K$ is usefully increased in a starting clutch designed as a wet clutch, each by a safety margin $\Delta x_{KS}$ or $\Delta p_{KS}$, so that undesired backward rolling of the motor vehicle can be reliably prevented.

The respective safety margin ($\Delta p_{BS}$, $\Delta x_{KS}$, $\Delta p_{KS}$) can even be held constant throughout the starting process. Since, however, uncertainty about the amount of the sum of the braking torque $M_B$ and the clutch torque $M_K(M_B+M_K)$ becomes smaller toward the end of the engagement process for the starting clutch, it is provided according to a preferred embodiment that the safety margin ($\Delta p_{BS}$, $\Delta x_{KS}$, $\Delta p_{KS}$) used is reduced with increasing clutch torque $M_K$ of the starting clutch, or with an increasing variable ($x_K$, $P_K$) determining the amount of the clutch torque $M_K$. It is hereby ensured that the clutch torque $M_K$ at the end of the engagement process of the starting clutch corresponds exactly to the holding torque $M_H$, so that even with a corresponding slight deflection of the accelerator pedal a holding of the motor vehicle on a gradient using only the accelerator pedal is possible, and with more deflection of the accelerator pedal, jerky starting of the vehicle is avoided.

In order to ensure that the dependently controlled process can follow the independently controlled process, and the starting method is not unnecessarily delayed, it is usefully provided that the more slowly controllable process of the processes of "build-up of the clutch torque $M_K$ of the starting clutch" and "reduction of the braking torque $M_B$ of the service brake" is controlled after a predetermined, time-related course of function, which is to say independently of other control processes, and the more quickly controllable process is controlled as a function of the more slowly controllable process.

If it is determined in the determination of the driving resistance $F_W$ that resistance points in the direction of the selected driving direction or, which is synonymous, that the roadway inclination a is negative or descending, then the service brake is released and the starting mode is ended prematurely. In the process, rolling of the motor vehicle that can be controlled by way of the brake pedal is enabled, and quick starting, which may come as a surprise to the driver, using the engine torque $M_M$ or the clutch torque $M_K$ transmitted by the starting clutch, together with the downhill-slope force in the same direction, is avoided.

The ratio $i_G$ set in the transmission is advantageously acquired by a sensor. If it is thereby found that the driver or the automatic transmission controller set a ratio $i_G$ in the transmission that is not suitable for starting, which is to say that in a step-by-step variable speed transmission an unsuitable gear was engaged, or in a continuously variable transmission an unsuitable ratio was set, then the service brake is likewise released and the starting mode is ended, whereby backward rolling of the motor vehicle, as well as a thermal overload of the starting clutch, are avoided.

Likewise, it is advantageous that actuation of a parking brake be acquired by a sensor. If thereby actuation of a parking brake is registered during an activated starting mode, the service brake can also be released and the starting mode can be ended. In this case, it can be assumed that the driver himself wants to coordinate the starting process by a simultaneous actuation of the accelerator pedal and an actuation element associated with the parking brake, such as a hand brake lever, which can be advantageous on slippery ground, especially in icy conditions, compared to an automatically controlled starting method.

The release of the service brake occurring in conjunction with a premature abandonment of the starting mode can selectively take place independently of current actuation of the brake pedal, or only after the release of the brake pedal. In the case of an independent release of the service brake, the brake pressure $p_B$ of the service brake is preferably reduced to a value that corresponds to the current travel distance) $x_{BP}$ of the brake pedal, and preferably to zero in the case of the release of the service brake after the release of the brake pedal.

Such that the driver is not surprised by the release of the service brake and the end of the automatically supported starting process, this should be indicated to him by an acoustic signal, such as the output of a warning sound from a speaker, and/or by an optical signal, such as the blinking of a warning light in the driver's field of vision, or by a text field in a display instrument.

BRIEF DESCRIPTION OF THE DRAWINGS

To clarify the invention, drawings are attached to the description along with examples of embodiments.

Shown are

DETAILED DESCRIPTION OF THE PREFERRED EMBODIMENTS

Figure 1:
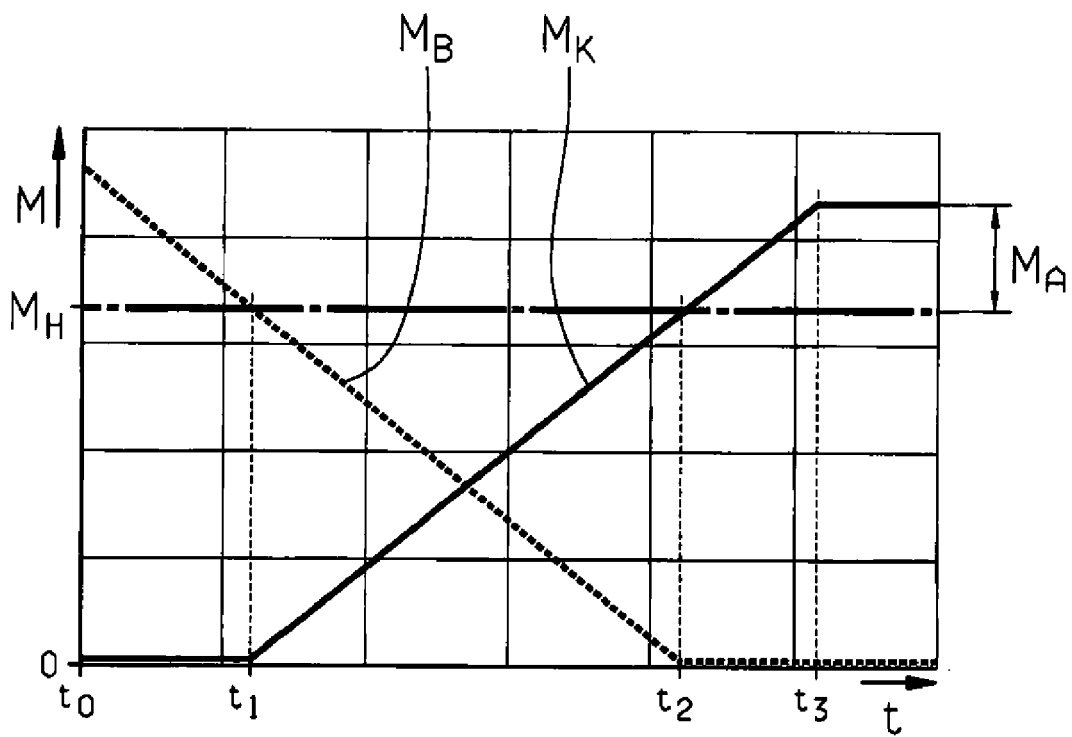
FIG. 1 The courses over time of the clutch torque $M_K$ and the braking torque $M_B$ in a starting process controlled according to the invention, and FIG. 2 the courses over time of the clutch torque $M_K$ and the braking torque $M_B$ in a controlled starting process that is refined compared to FIG. 1.

Depicted in the time diagram of FIG. 1 are the courses over time of the clutch torque $M_K$ of a starting clutch and the braking torque $M_B$ of a service brake, as they develop in a motor vehicle during the starting process, which runs in a controlled manner according to the invention with an activated starting mode of a starting assistance controller. Before the point in time $t_0$, the motor vehicle is brought to a stop or placed into operation. The driving engine runs, the starting clutch is open or disengaged, a starting gear is engaged in the transmission, or a starting ratio has been set, and the driver actuated the service brake by way of the brake pedal, so that the starting mode is activated and the brake pressure $p_B$ set in the service brake is initially held after the release of the brake pedal. With the actuation of the accelerator pedal by the driver at the point in time $t_0$, the starting process supported by the starting assistance controller begins.

The starting clutch remains disengaged until the point in time $t_1$, which is to say the clutch torque $M_K$ is equal to zero, and the braking pressure $p_1$ of the service brake is decreased so far that the braking torque $M_B$ of a service brake corresponds just barely to the previously determined holding torque $M_H(M_B=M_H)$, which is currently required to hold the motor vehicle on a gradient. Then the service brake is further released between the points in time $t_1$ and $t_2$ in a coordinated manner, and the starting clutch is engaged, so that the sum of the decreasing brake torque $M_B$ and the increasing clutch torque $M_K$ corresponds at all times to the holding torque $M_H(M_B+M_K=M_H)$.

In this way, the motor vehicle is not only prevented from rolling backward against the direction of travel, but it is also avoided that the starting clutch presses against the service brake with the respective clutch torque $M_K$, which is to say must work against the braking torque $M_B$ set via the momentary brake pressure $P_B$. Thus unnecessary wear, especially on the friction elements of the starting clutch, as well as an uncomfortable starting jerk with a further released service brake, are avoided.

After the complete release of the service brake at the point in time $t_2$, the starting clutch is further engaged until an acceleration torque $M_A$ has developed at the point in time $t_3$, which enables the starting acceleration requested by the driver via the travel distance $x_{FP}$ of the accelerator pedal. Having knowledge of the invention, it is obvious that simultaneous with engagement of the starting clutch, the engine torque $M_M$ of the driving engine is also increased accordingly, so that the clutch torque $M_K$ set in the starting clutch is in fact transmitted and forwarded, via the transmission as well as an axle differential gear and/or a central differential gear, to the drive wheels. For a simplification of the illustration, the torque curves $M_B$, $M_K$ are shown linearly in FIG. 1.

Figure 2:
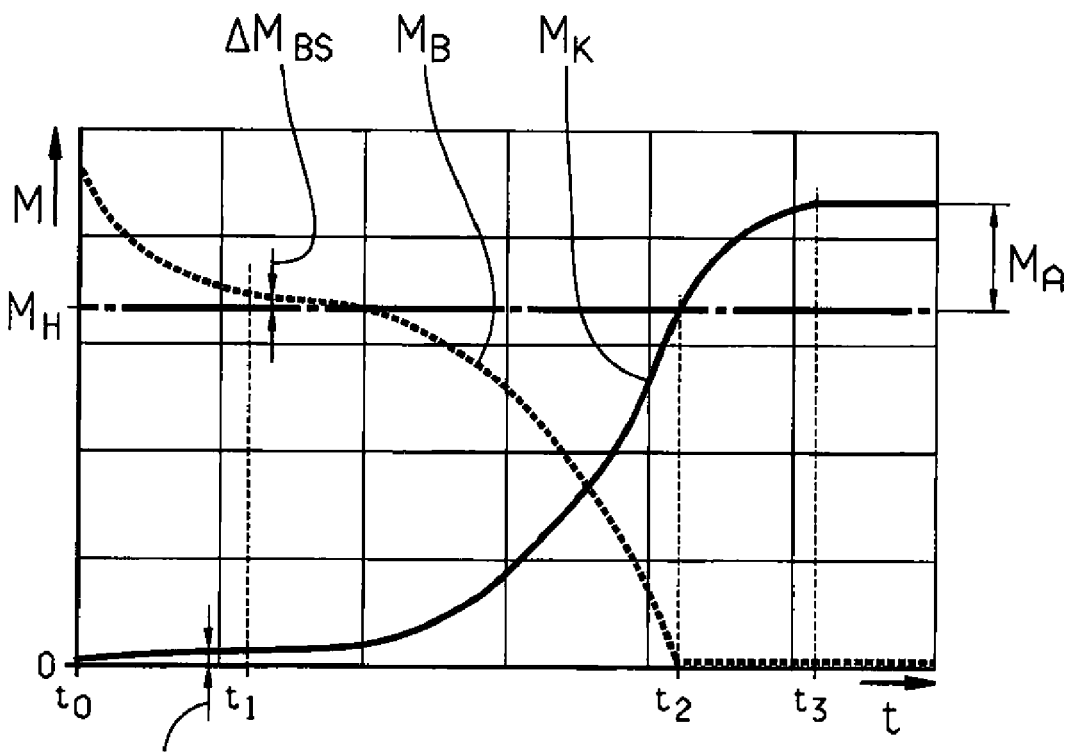

Shown in the diagram according to FIG. 2 is a starting method, which is the same in principle as in FIG. 1, however, the torque curves $M_B$, $M_K$ are depicted more realistically as non-linear and the control sequences are improved in some details. While the service brake is progressively disengaged between the points in time $t_0$ and $t_1$ to approximately the holding torque $M_H$, the starting clutch is already engaged up to the grip point thereof, so that the starting clutch at the point in time $t_1$ already transmits a minimal initial torque $M_{K0}$. By means of this measure, a quick response of the starting clutch for the following control is achieved, and an exact setting of the clutch torque $M_K$ is enabled.

Thereafter, the starting clutch is degressively engaged according to a previously determined, time-related course of function until the clutch torque $M_K$ at the point in time $t_2$ corresponds exactly to the holding torque $M_H(M_K=M_H)$. Between the point in time $t_1$ and point in time $t_2$, the service brake is released as a function of the presently set clutch torque $M_K$ or one of the variables determining the amount of the clutch torque $M_K$, such as the engagement travel $x_K$ for a dry clutch and the engagement pressure $p_K$ for a wet clutch, such that the sum of the clutch torque $M_K$ and the braking torque $M_B$ corresponds approximately to the holding torque $M_H(M_K+M_B=M_H)$, which likewise causes a degressive course of the braking torque $M_B$.

Since the determination of the exact clutch torque $M_K$ and the exact setting of the braking torque $M_B$ is associated with a given uncertainty, the brake pressure $p_B$ to be set on the service brake is increased by a safety margin $\Delta p_{BS}$. This safety margin $\Delta p_{BS}$, which preferably becomes smaller with an increasing clutch torque $M_K$ causes a braking torque $M_B$ that is increased by a torque margin $\Delta M_{BS}$, whereby undesired backward rolling of the motor vehicle is reliably prevented.

After the complete release of the service brake at the point in time $t_2$, the starting clutch is progressively further engaged until the acceleration torque $M_A$ required for the generation of the starting acceleration requested by the driver by way of a deflection of the accelerator pedal is set at the point in time $t_3$.

REFERENCE CHARACTERS $a_F$ Vehicle acceleration
$A_B$ Average friction surface of wheel brakes
$F_A$ Acceleration force
$F_R$ Rolling resistance
$F_S$ Climbing resistance
$F_W$ Driving resistance
g Gravitational acceleration
$i_0$ Ratio of a differential gear
$i_G$ Ratio of a transmission
$m_F$ Vehicle weight
M Torque
$M_A$ Acceleration torque
$M_B$ Brake torque
$M_{BR}$ Wheel brake torque
$M_H$ Holding torque
$M_K$ Clutch torque
$M_{K0}$ Initial torque
$M_M$ Engine torque
$n_{BR}$ Number of wheel brakes
$p_B$ Brake pressure of service brake
$p_K$ Engagement pressure of starting clutch
$r_B$ Average effective radius of the wheel brakes
$r_R$ Wheel radius
t Time
$t_0$ Point in time
$t_1$ Point in time
$t_2$ Point in time
$t_3$ Point in time
$x_{BP}$ Travel distance of accelerator pedal
$x_{FP}$ Travel distance of accelerator pedal
$x_K$ Engagement travel of starting clutch
α Inclination angle, roadway incline
$\Delta M_{BS}$ Torque margin
$\Delta p_{BS}$ Safety margin for brake pressure
$\Delta p_{KS}$ Safety margin for engagement pressure
$\Delta x_{KS}$ Safety margin for engagement travel
$\mu_B$ Friction coefficient of the wheel brakes

The invention claimed is:

1. A method of starting control of a motor vehicle having a drive train comprising a drive engine being controlled automatically and by way of an accelerator pedal, an automated friction starting clutch, a transmission with variable gear ratios, and a service brake, which is configured as a pressure medium-actuated friction brake and controlled automatically by way of a brake pedal, in a starting mode of a starting assistance controller, which is actuatable when the vehicle is stationary, the drive engine is running, the starting clutch is disengaged, a gear ratio is set, and the service brake is actuated by way of the brake pedal, upon release of the brake pedal, the service brake initially remaining engaged by maintaining a brake pressure ($p_B$) previously set by the brake pedal, and upon a subsequent actuation of the accelerator pedal, an engine torque ($M_M$) of the driving engine being increased, clutch torque ($M_K$) of the starting clutch being increased by an engaging the starting clutch, and brake torque ($M_B$) of the service brake being reduced by lowering of the brake pressure ($p_B$), the method comprising the steps of:

determining a braking torque ($M_B$) set by a driver using the brake pedal, an acceleration torque ($M_A$) requested by the driver by way of the accelerator pedal, and a holding torque ($M_H$) required for maintaining the motor vehicle on a gradient;

coordinating the engagement of the starting clutch and release of the service brake such that during the release of the service brake, a sum of the clutch torque ($M_K$) and the braking torque ($M_B$) corresponds to the holding torque ($M_H$) ($M_K+M_B=M_H$), and the clutch torque ($M_K$) of the starting clutch is only increased by the acceleration torque ($M_A$) when the service brake has been largely released ($M_B=0$);

calculating a climbing resistance ($F_S$) with a roadway incline ($\alpha$) and a vehicle weight ($m_F$);

calculating a driving resistance ($F_W$) with the climbing resistance ($F_S$) and a determined rolling resistance ($F_R$); and calculating the holding torque ($M_H$) related to a plane of the starting clutch using the driving resistance ($F_W$), a radius ($r_R$) of drive wheels, and a ratio ($i_D$) of either an axle and a central differential, and a ratio ($i_G$) of the transmission.

2. The method according to claim 1, further comprising the steps of acquiring the brake pressure ($p_B$) of the service brake by a sensor, for the determination of the brake torque ($M_B$), and calculating wheel brake torque ($M_{BR}$) from the determined brake torque ($M_B$) and a geometry of the service brakes, and calculating the braking torque ($M_B$) in relation to a plane of the starting clutch by a resulting ratio ($i_D$) of either an axle or a central differential and a ratio ($i_G$) of the transmission.

3. A method of starting control of a motor vehicle having a drive train comprising a drive engine being automatically controlled by way of an accelerator pedal, an automated friction starting clutch, a transmission with variable gear ratios, and a service brake, which is configured as a pressure medium-actuated friction brake and controlled automatically and by way of a brake pedal, in a starting mode of a starting assistance controller, which is actuatable when the vehicle is stationary, the drive engine is running, the starting clutch is disengaged, a gear ratio is set, and the service brake is actuated by way of the brake pedal, upon release of the brake pedal, the service brake initially remaining engaged by maintaining a brake pressure ($p_B$) previously set by the brake pedal, and upon a subsequent actuation of the accelerator pedal, an engine torque ($M_M$) of the driving engine being increased, clutch torque ($M_K$) of the starting clutch being increased by an engaging the starting clutch, and a brake torque ($M_B$) of the service brake being reduced by lowering of the brake pressure ($p_B$), the method comprising the steps of:

determining a braking torque ($M_B$) set by a driver using the brake pedal, an acceleration torque ($M_A$) requested by the driver by way of the accelerator pedal, and a holding torque ($M_H$) required for maintaining the motor vehicle on a gradient;

coordinating the engagement of the starting clutch and release of the service brake such that during the release of the service brake, a sum of the clutch torque ($M_K$) and the braking torque ($M_B$) corresponds to the holding torque ($M_H$) ($M_K+M_B=M_H$), and the clutch torque ($M_K$) of the starting clutch is only increased by the acceleration torque ($M_A$) when the service brake has been largely released ($M_B=0$); and acquiring at least one of a position ($x_{FP}$) and a control speed ($dx_{FP}/dt$) of the accelerator pedal, via a sensor, for the determination of the acceleration torque ($M_A$) and determining from the determined acceleration torque ($M_A$), a requested vehicle acceleration ($a_F$), and then, calculating an acceleration force ($F_A$) with the requested acceleration ($a_F$), a determined vehicle weight ($m_F$), and calculating the acceleration torque ($M_A$) in relation to a plane of the starting clutch, using an effective radius ($r_R$) of drive wheels, a resulting ratio ($i_D$) of either an axle and a central differential, and a ratio ($i_G$) of the transmission.

4. The method according to claim 1, further comprising the step of delaying engagement of the starting clutch until the brake pressure ($p_B$) of the service brake is reduced such that the braking torque ($M_B$) corresponds to about the holding torque ($M_H$) ($M_B=M_H$), if the braking torque ($M_B$) [$M_B>M_H$] is above the holding torque ($M_H$) at a beginning of the starting method.

5. The method according to claim 4, further comprising the step of engaging the starting clutch to a grip point during the delay of engagement of the starting clutch.

6. The method according to claim 1, further comprising the step of engaging the starting clutch after a predetermined, time-related course of function, and using either the clutch torque ($M_K$) of the starting clutch or a variable ($x_K$, $P_K$) determining the amount of the clutch torque ($M_K$) as a control parameter to control the reduction of the braking torque ($M_B$) of the service brake.

7. The method according to claim 6, further comprising the step of using an engagement travel ($x_K$), with a starting clutch configured as a dry clutch, and an engagement pressure ($p_K$) with a starting clutch configured as a wet clutch, as a control parameter for the reduction of the braking torque ($M_B$) of the service brake.

8. The method according to claim 6, further comprising the step of increasing the brake pressure ($p_B$) of the service brake by a safety margin ($\Delta p_{BS}$) during the reduction of the braking torque ($M_B$).

9. The method according to claim 1, further comprising the step of releasing the service brake after a predetermined, time-related course of function, and using either the braking torque ($M_B$) or a variable ($p_B$), which determines the amount of the braking torque ($M_B$), as a control parameter to control the build-up of the clutch torque ($M_K$) of the starting clutch.

10. The method according to claim 9, further comprising the step of using the brake pressure ($p_B$) of the service brake as the control parameter for the build-up of the clutch torque ($M_K$) of the starting clutch.

11. The method according to claim 9, further comprising the step of increasing an engagement travel ($x_K$), in a starting clutch designed as a dry clutch, and an engagement pressure ($p_K$), in a starting clutch designed as a wet clutch, by a safety margin ($\Delta x_{KS}$, $\Delta p_{KS}$) during the build-up of the clutch torque ($M_K$).

12. The method according to claim 8, further comprising the step of reducing the safety margin ($\Delta p_{BS}$, $\Delta X_{KS}$, $\Delta p_{KS}$) with either an increasing clutch torque ($M_K$) of the starting clutch or an increasing variable ($x_K$, $p_K$) determining the amount of the clutch torque ($M_K$).

13. The method according to claim 8, further comprising the step of controlling a more slowly controllable process of the processes of "build-up of the clutch torque ($M_K$) of the starting clutch" and "reduction of the braking torque ($M_B$) of the service brake" after a predetermined, time-related course of function, and controlling a more quickly controllable process as a function of the more slowly controllable process.

14. The method according to claim 1, further comprising the step of releasing the service brake and ending the starting mode when a determined driving resistance ($F_W$) points in a direction of travel.

15. The method according to claim 1, further comprising the step of acquiring a ratio ($i_G$) set in the transmission by a sensor, and releasing the service brake and ending the starting mode if the determined ratio ($i_G$) set in the transmission is unsuitable for starting.

16. The method according to claim 1, further comprising the step of acquiring actuation of a parking brake by a sensor, and releasing the service brake and ending the starting mode the parking brake.

17. The method according to claim 14, further comprising the step of releasing the service brake independently of a current actuation of the brake pedal, by reducing the brake pressure ($p_B$) of the service brake to a value corresponding to a current travel distance ($x_{BP}$) of the brake pedal.

18. The method according to claim 14, further comprising the step of only releasing the service brake, by releasing the brake pedal, after reducing the brake pressure ($p_B$) of the service brake to zero.

19. The method according to claim 14, further comprising the step of indicating the release of the service brake to the driver by at least one of an acoustic signal and an optical signal.

* * * * *